US010963522B2

(12) United States Patent
Lu et al.

(10) Patent No.: US 10,963,522 B2
(45) Date of Patent: *Mar. 30, 2021

(54) SYSTEMS FOR AND METHODS OF FINDING RELEVANT DOCUMENTS BY ANALYZING TAGS

(71) Applicant: Pinterest, Inc., San Francisco, CA (US)

(72) Inventors: Yunshan Lu, Palo Alto, CA (US); Michael Tanne, Los Altos, CA (US)

(73) Assignee: Pinterest, Inc., San Francisco, CA (US)

(*) Notice: Subject to any disclaimer, the term of this patent is extended or adjusted under 35 U.S.C. 154(b) by 7 days.

This patent is subject to a terminal disclaimer.

(21) Appl. No.: 15/625,876

(22) Filed: Jun. 16, 2017

(65) Prior Publication Data

US 2017/0357723 A1 Dec. 14, 2017

Related U.S. Application Data

(63) Continuation of application No. 11/498,448, filed on Aug. 2, 2006, now Pat. No. 9,715,542.
(Continued)

(51) Int. Cl.
*G06F 16/30* (2019.01)
*G06F 16/951* (2019.01)

(52) U.S. Cl.
CPC .................. *G06F 16/951* (2019.01)

(58) Field of Classification Search
CPC .............................. G06F 17/241; G06F 16/951
(Continued)

(56) References Cited

U.S. PATENT DOCUMENTS 5,680,511 A 10/1997 Baker et al.
5,835,712 A 11/1998 DuFresne
(Continued)

FOREIGN PATENT DOCUMENTS

JP H10254886 A 9/1998
JP 2001-350794 12/2001
(Continued)

OTHER PUBLICATIONS

International Search Report for PCT Application No. PCT/US2006/030443 dated Jul. 12, 2007.
(Continued)

*Primary Examiner* — Kuen S Lu
(74) *Attorney, Agent, or Firm* — Athorus, PLLC (57) ABSTRACT

A method of determining relevancies of objects to a search query includes associating multiple tags with multiple objects, recording bookmarks to the multiple objects, or both, and determining a relevance score for each of the multiple objects and a search query. One embodiment of the method combines full-text relevance algorithms with tag relevance algorithms. Other embodiments include statistical relevance algorithms such as statistical classification or rank regression algorithms. When a user executes a search query, a results list containing the objects is returned, with the objects organized based on the relevance scores. The objects are organized by, for example, listing those with the highest relevance scores first or by marking them with an indication of their relevance. Preferably, relevance scores for a tag-object pair are based on a number of times a term in the tag has been associated with the object, a number of tags associated with the object, a number of times that the tag has been associated with the multiple objects, a number of tag-object pairs that contain a term in the tag, a number of
(Continued)

tag-object pairs that contain a reference to the object, or any combination of these.

41 Claims, 7 Drawing Sheets

Related U.S. Application Data (60) Provisional application No. 60/705,704, filed on Aug. 3, 2005.

(58) Field of Classification Search
USPC .................................................. 707/3, 4, 739
See application file for complete search history.

(56) References Cited

U.S. PATENT DOCUMENTS

| | | | |
|---|---|---|---|
| 5,899,972 A * | 5/1999 | Miyazawa | ............... G10L 15/22 704/249 |
| 5,991,735 A | 11/1999 | Gerace | |
| 6,029,195 A | 2/2000 | Herz | |
| 6,070,176 A | 5/2000 | Downs et al. | |
| 6,112,203 A | 8/2000 | Bharat et al. | |
| 6,256,622 B1 | 7/2001 | Howard et al. | |
| 6,324,566 B1 | 11/2001 | Himmel et al. | |
| 6,327,590 B1 | 12/2001 | Chidlovskii et al. | |
| 6,336,112 B2 | 1/2002 | Chakrabarti et al. | |
| 6,360,215 B1 | 3/2002 | Judd et al. | |
| 6,601,075 B1 | 7/2003 | Huang et al. | |
| 6,714,929 B1 | 3/2004 | Micaelian et al. | |
| 6,718,365 B1 | 4/2004 | Dutta | |
| 6,775,664 B2 | 8/2004 | Lang et al. | |
| 6,810,395 B1 | 10/2004 | Bharat | |
| 6,823,491 B1 | 11/2004 | McBrearty et al. | |
| 6,829,599 B2 | 12/2004 | Chidlovskii | |
| 7,032,030 B1 | 4/2006 | Codignotto | |
| 7,188,117 B2 | 3/2007 | Farahat et al. | |
| 7,283,997 B1 | 10/2007 | Loward, Jr. et al. | |
| 7,395,259 B2 | 7/2008 | Bailey et al. | |
| 7,428,505 B1 | 9/2008 | Levy et al. | |
| 7,590,619 B2 | 9/2009 | Hurst-Hiller et al. | |
| 7,668,821 B1 * | 2/2010 | Donsbach | ............ G06Q 30/0631 707/765 |
| 7,756,855 B2 | 4/2010 | Ismalon | |
| 7,890,501 B2 | 2/2011 | Lunt et al. | |
| 8,375,048 B1 | 2/2013 | Wad et al. | |
| 2002/0073065 A1 | 6/2002 | Inaba et al. | |
| 2002/0120609 A1 | 8/2002 | Lang et al. | |
| 2002/0129014 A1 | 9/2002 | Kim et al. | |
| 2002/0156779 A1 | 10/2002 | Elliott et al. | |
| 2002/0165856 A1 | 11/2002 | Gilfillan et al. | |
| 2003/0041054 A1 | 2/2003 | Mao et al. | |
| 2003/0046098 A1 | 3/2003 | Kim | |
| 2003/0078914 A1 | 4/2003 | Witbrock | |
| 2003/0161285 A1 | 8/2003 | Tiedemann, Jr. et al. | |
| 2003/0212663 A1 | 11/2003 | Leno et al. | |
| 2004/0024739 A1 * | 2/2004 | Copperman | ............ G06F 16/367 |
| 2004/0024755 A1 | 2/2004 | Rickard | |
| 2004/0030697 A1 | 2/2004 | Cochran et al. | |
| 2004/0068486 A1 | 4/2004 | Chidlovskii | |
| 2004/0083127 A1 | 4/2004 | Lunsford | |
| 2004/0117354 A1 | 6/2004 | Azzaro et al. | |
| 2004/0133342 A1 | 7/2004 | Banker | |
| 2004/0215608 A1 | 10/2004 | Gourlay | |
| 2004/0254917 A1 | 12/2004 | Brill et al. | |
| 2005/0033771 A1 | 2/2005 | Schmitter et al. | |
| 2005/0060210 A1 | 3/2005 | Levi et al. | |
| 2005/0071325 A1 | 3/2005 | Bem | |
| 2005/0071328 A1 | 3/2005 | Lawrence | |
| 2005/0131866 A1 | 6/2005 | Badros et al. | |
| 2005/0144162 A1 | 6/2005 | Liang | |
| 2005/0149473 A1 | 7/2005 | Weare | |
| 2005/0149499 A1 | 7/2005 | Franz et al. | |
| 2005/0234972 A1 | 10/2005 | Zeng et al. | |
| 2005/0256866 A1 | 11/2005 | Lu | |
| 2005/0262062 A1 | 11/2005 | Xia | |
| 2005/0289120 A9 | 12/2005 | Soulanille et al. | |
| 2005/0289133 A1 | 12/2005 | Arrouye et al. | |
| 2006/0004748 A1 | 1/2006 | Ramarathnam | |
| 2006/0047643 A1 | 3/2006 | Chaman | |
| 2006/0069561 A1 | 3/2006 | Beattie | |
| 2006/0170705 A1 | 8/2006 | Wilson | |
| 2006/0173880 A1 | 8/2006 | Alberts et al. | |
| 2006/0221190 A1 * | 10/2006 | Limberis | ................. G06F 16/48 348/207.1 |
| 2006/0242139 A1 * | 10/2006 | Butterfield | .............. G06F 16/93 |
| 2006/0251292 A1 | 11/2006 | Gokturk et al. | |
| 2006/0251338 A1 | 11/2006 | Gokturk | |
| 2006/0271524 A1 | 11/2006 | Tanne et al. | |
| 2007/0011154 A1 | 1/2007 | Musgrove et al. | |
| 2007/0106659 A1 | 5/2007 | Lu et al. | |
| 2007/0112758 A1 | 5/2007 | Livaditis | |
| 2007/0112761 A1 * | 5/2007 | Xu | ....................... G06F 16/9535 |
| 2009/0089272 A1 | 4/2009 | Oliver et al. | |
| 2009/0089322 A1 * | 4/2009 | Naaman | ................... G06F 16/48 |
| 2014/0280551 A1 | 9/2014 | Byrd Vallieres de St. Real | |
| 2016/0379074 A1 * | 12/2016 | Nielsen | ................. G06K 9/3241 348/143 |

FOREIGN PATENT DOCUMENTS

| | | |
|---|---|---|
| JP | 2004-013323 | 1/2004 |
| TW | 530224 | 5/2003 |
| TW | 548557 | 8/2003 |
| TW | 200422878 | 11/2004 |
| WO | 9966427 | 12/1999 |

OTHER PUBLICATIONS

Wee Meng Soon et al., "Corpus-Based Learning for Noun Phrase Coreference Resolution", DSO National Laboratories, pp. 285-291.

Julian Kupiec et al., "A Trainable Document Summarizer", Xerox Palo Alto Research Center, 6 pages.

Hwee Tou Ng et al., "A Machine Learning Approach to Answering Questions for Reading Comprehension Tests", DSO National Laboratories, pp. 124-132.

Lynette Hirschman et al., "Deep Read: A Reading Comprehension System", The MITRE Corporation, pp. 325-332.

Stephen Soderland, "Learning Information Extraction Rules for Semi-Structured and Free Text", Machine Learning, 34, 233-272 (1999).

Yimin Liu et al., "Building Semantic Perceptron Net for Topic Spoiling", School of Computing, National University of Singapore, 8 pages.

Yiming Yang et al., "A Comparative Study on Feature Selection in Text Categorization", 9 pages.

Richard M. Tong et al., "Conceptual Information Retrieval using Rubric", Advanced Decision Systems, pp. 247-253.

K. Sparck Jones et al., "A probabilistic model of information retrieval: development and status", Computer Laboratory, University of Cambridge, Aug. 1998, pp. 1-74.

Gerard Salton, "Dynamic Document Processing", Communications of the ACM, 15(7), 658-668 (1972).

Sergey Brin et al., "The Anatomy of a Large-Scale Hypertextual Web Search Engine", Computer Science Department, Stanford University, pp. 1-26.

Yiming Yang et al., "A re-examination of text categorization methods", Proceedings of SIGIR '99, pp. 42-49.

Steve Lawrence & C. Lee Giles, "Accessibility of information on the web", Nature, 400(8), Jul. 1999, pp. 107-109.

Claire Cardie "Empirical Methods in Information Extraction", AI Magazine, 18(4), 1997, pp. 65-79.

Vladimir Eske "User Profile Management in a Web Search Engine", Computer Science Department Saarland University, Jun. 2004, pp. 1-123.

Search Report and Preliminary Opinion, European Patent Office, dated Sep. 6, 2010, European Patent Application No. 06738810.8, Search Engine Technologies, LLC.

(56) References Cited

OTHER PUBLICATIONS

Notification of Examination, Taiwan Intellectual Property Office, dated Sep. 23, 2010, Taiwan Patent Application No. 095109496, Wink Technologies.
Foreign Office Action; Taiwan Patent Office, dated Apr. 1, 2011, Taiwan Patent Application No. 095128551, Filed Aug. 3, 2006.
Yu Suzuki, An Automatic Selection Method of Integration Function, Technical Report of IEICE, Japan, The Institute of Electronics, Information and Communication Engineers, Jul. 7, 2004, vol. 104, No. 177, pp. 195-200.
Foreign Office Action, China Patent Office, dated Jul. 6, 2011, China Patent Application No. 200680013556.8, Filed Feb. 28, 2006.
Extended European Search Report, European Patent Office, dated Aug. 25, 2011, European Patent Application No. 06800757.4, Filed Aug. 3, 2006.
tripadvisor.com Web site, searching for keywords "Paris", Aug. 18, 2004 (Aug. 18, 2004) from http://web.archive.org/web/20040818035209/http://www.tripadvisor.com/Tourism-g187147-Paris_Ile_de_France-Vacations.html, Aug. 18, 2004, 3 pages.
Dong et al., Similarity Search for Web Services, 2004, 12 pages.

\* cited by examiner

SYSTEMS FOR AND METHODS OF FINDING RELEVANT DOCUMENTS BY ANALYZING TAGS

RELATED APPLICATION

This application is a continuation application of the U.S. patent application Ser. No. 11/498,448, filed Aug. 2, 2006, and titled "Systems for and Methods of Finding Relevant Documents by Analyzing Tags," which claims priority under 35 U.S.C. § 119(e) of U.S. provisional patent application Ser. No. 60/705,704, filed Aug. 3, 2005, and titled "Techniques for Finding Relevant Documents Using Analysis of Tags," both of which are hereby incorporated by reference.

FIELD OF THE INVENTION

This invention relates to searching for documents. More specifically, this invention relates to systems for and methods of searching for information on the Internet by analyzing tags created by people to improve the quality or relevance of search results.

BACKGROUND OF THE INVENTION

Internet search engines are designed to locate desired information from amongst the vast amount of information contained across the Internet. Users describe the information they are looking for by entering queries containing search terms. The search engine matches the search terms against an index of Web pages using a variety of relevance calculations with the objective of identifying those Web pages that are most likely related to the information sought by the users. The search engine then returns a ranked list of hyperlinks to these Web pages, with links to those pages thought to be most relevant nearer the top of the list.

The objective of search engines is to deliver the most relevant Web pages for a given query. Search engines determine the relevance of Web pages using a variety of techniques by, for example, considering information contained within each page, such as the presence, density, and proximity of the search terms within the document, considering information relating to hyperlinks between the Web pages, or the behavior of the user, such as clicking on, browsing, or rating results or Web pages. These techniques may be applied separately or together in various combinations to achieve the best result.

The process of determining which Web pages are most relevant is very difficult because the number of Web pages on the Internet is very large and growing, and there are often a large number of Web pages that nominally satisfy the users' queries. As well, most users are not sophisticated in the process of creating and entering well-formed queries, so there is ambiguity in what type of information they are seeking. Therefore, determining which documents are most relevant to the query by comparing the words in the query to words in the documents provides results of limited accuracy.

When users browse or search the Internet, they may "bookmark" various objects, such as Web pages, images, topics, Weblogs (also called "blogs") or other objects by recording a reference to the object. These bookmarks may contain one or more "tags", consisting of one or more terms, which the user associates with the object, a hyperlink to the object (a Uniform Resource Locator or "URL"), a mechanism for recording the relationship, and potentially other information. These bookmarks assist the user in recalling the object and any tags to assist in recalling or communicating to others what the object bookmarked is about. For example, if a user visits a Web page that describes solar power panels for the roof, he might bookmark and associate a tag with the page using the term "solar power". He might also associate another Web page about a State solar power rebate program with the same tag using the term "solar power". As a result, the tag with the term "solar power" is associated with both Web pages.

There are several ways in which users might enter tags, for example using a server application, a small applet in the bookmarks toolbar, a browser plug-in or extension, a client application or some other application. Once tags have been entered, it is usual to allow users to search for these tags, in order to display those Web pages associated with the tags. To date, services have been created that allow users to search their own tags, or to search other people's tags.

Bookmarks provide some kind of indication that a user values an object such as a Web page, and tags additionally provide some kind of indication that a user associates a certain term or terms with the object. This information is potentially valuable in determining whether or not that Web page should be displayed as a result of a query from a search engine, since it is an indication of actual human interest in that Web page, and an association with a particular subject.

It would be desirable to have a search engine that considers the tags associated with various Web pages, images, blogs or other objects in determining which Web pages, images, blogs or other objects are relevant to the user's queries.

SUMMARY OF THE INVENTION

Embodiments of the present invention provide users with a list of objects (the results list) in response to search queries. The results list is organized based on a relevance of each object to the query. Preferably, relevance is based on tagging the objects, bookmarking, the objects, both, or any other user action to indicate the relevance or value of an object to a search.

In a first aspect of the present invention, a method of determining relevancies of multiple objects to a query includes recording "bookmarks," references to objects and/or associating multiple tags with these objects and determining a relevance score for each object of the multiple objects for any given query. The method is used to later organize objects for display within a results list returned in response to a search query. Objects include hyperlinks or groups of hyperlinks to Web pages, text, images, photographs, tags, groups of tags, subject areas, concepts, audio files, video files, software, or any combination of these.

Each tag from the multiple tags contains one or more terms. The method also includes associating each term from the one or more terms with an object, thereby defining one or more corresponding term-object pairs, and determining for each term-object pair a term score indicating a degree of relevance between the term and the object. Alternatively, or additionally, the method also includes bookmarking the object.

Preferably, a relevance score for a tag-object pair is determined by combining the term scores for the term-object pairs for each term in the tag. Terms scores can be combined by summing them or by weighing them with weights and summing the weighted term scores.

In one embodiment, a relevance score for a tag-object pair is determined from a number of times a term in the tag has been associated with the object, a number of tags associated with the object, a number of times that the tag has been associated with the multiple objects, or any combination of these. A relevance score for a tag-object pair can also be determined from a number of tag-object pairs that contain a term in the tag, a number of tag-object pairs that contain a reference to the object, or both.

In another embodiment, the method also includes associating a tag with an object from the multiple objects by a first user, performing a search query containing one or more terms in the tag by a second user, organizing the multiple objects in the results list based on the relevance scores, thereby defining an organized results list, and returning the organized results list to the second user. A relevance score for an object and the search query corresponds to the relevance scores for each term of the search query present in the object or associated with it. Alternatively, or additionally, a relevance score for a tag-object pair from the multiple tag-object pairs is determined from a number of tags that the first user has associated with any of the multiple objects, a number of objects that the first and second users have associated with tags, a rating of the object, bookmarking the object, or any combination of these.

In another embodiment, a relevance score for a tag-object pair is determined from a confidence rating of a selected one of the first user, the second user, or both. A confidence rating is determined from a rating for tags that the selected user has associated with objects, a similarity metric between bookmarking, tagging, or search activities for the first and second users, a relationship metric between the first and second users, or any combination of these.

The multiple objects can be organized by ordering them based on the relevance scores (e.g., highest ranking objects are listed first) or by marking at least one of the multiple objects with a graphic element.

A tag or a bookmark or a rating can be associated with an object by entering the tag into a field presented to a user, rating the tag, blocking a link to the object (thereby making a "negative" association), selecting the tag, selecting the object, examining a bookmark, or performing a search for the object using the tag. In one embodiment, a tag crawler associates at least one of the multiple tags with at least one of the multiple objects.

In a second aspect of the present invention, a method of populating a system used to return objects organized in a results list includes storing in a tag database multiple tags associated with multiple objects and storing in an index database relevance scores between the multiple tags and the multiple objects. The relevance scores are used to organize the multiple documents in an organized results list.

Multiple tags are stored in a tag database by storing terms that form the multiple tags. Relevance scores indicate a relevance between the terms and the objects. The method also includes storing in the index database multiple indices. Each index entry corresponds to a term from the multiple terms, a corresponding object from multiple objects, and a corresponding relevance score between the term and the object.

In one embodiment, each relevance score between a term and an object is related to a confidence rating of a user who associated the term with the object. Alternatively, or additionally, each relevance score for a term and an object is determined from a number of times that the object has been bookmarked or a number and value of ratings the object has been given. Alternatively, or additionally, each relevance score between a term and an object is determined from a statistical classification or rank regression algorithm such as logistic regression, support vector machines, classification or regression tree, or boosted tree ensembles.

The method also includes presenting a results list to a user in response to a search query containing a term or terms, the user associating the term to an object contained in the results list, and determining a relevance score between the term and the object. A relevance score between an object from the multiple objects and its associated tag is determined from a number of times that the tag has been associated with the object, a total number of tags associated with the object, a number of times that the tag has been associated with any of the multiple objects, a number of tags that have been associated with all of the multiple objects, a time that the tag was associated with the object, or any combination of these.

In a third aspect of the present invention, a method of organizing multiple objects for display in a results list includes correlating terms in a search query with tags associated with multiple objects and returning a results list containing the multiple objects organized based on the correlations.

In a fourth aspect of the present invention, a system for returning a search results list in response to a search query comprises a tag database for storing tags associated with objects and a tag analyzer coupled to the tag database. Objects include hyperlinks to Web pages, groups of hyperlinks, text, images, photographs, tags, groups of tags, subject areas, concepts, audio files, video files, software, or any combination of these. Preferably, the objects are hyperlinks to Web pages.

The tag analyzer is programmed to determine a relevance score between a tag and an object. In one embodiment, the system also includes an object index for storing relevance scores between tags and objects.

In one embodiment, a relevance score is determined by summing weighted relevance scores for terms that form a tag and objects. In another embodiment, a relevance score between a search query containing terms and an object is determined from a number of tags that contain terms in the search query, a number of times that a tag included in the search query is included in the tag database, a number of tags that have been associated with the object, a number of terms in the tag and in the search query that match, or any combination of these. In yet another embodiment, a relevance score for a tag and an object is based on a position of the tag within the object, the frequency of the tag within the object, a density of the tag within the object, or any combination of these.

In one embodiment, the weighting of a relevance score between a tag and an object is based on a level of confidence (confidence rating) assigned to a user who associated the tag with the object. The relevance score is determined using a statistical classification or rank regression algorithm, a clustering analysis algorithm, or a morphological analysis algorithm. The statistical classification algorithm includes logistic regression, support vector classification, classification tree, or classification tree ensembles.

In another embodiment, the system also includes a search engine coupled to the object index. The search engine is programmed to receive search queries containing terms that correspond to tags and to return an organized results list based on relevance scores for tag-object pairs. The system also includes a user database coupled to the search engine. The user database contains information related to search queries, such as links followed by a user, tags associated with objects, objects that were blocked by a user, or any combination of these.

DETAILED DESCRIPTION OF THE PREFERRED EMBODIMENT

Embodiments of the present invention, unlike traditional search engines, make use of either tags and/or bookmarks to provide more relevant information to users searching the Internet. In one embodiment, a search engine implements established methods for receiving a query and determining a list of relevant documents or groups of documents, analyzes the tags associated with documents or groups of documents to determine a list of relevant documents or groups of documents, and combines the two lists in some manner to deliver a results list to the user. It will be appreciated that while the examples that follow describe searching for and returning documents, the present invention can be used to search for and return any object including, but not limited to, hyperlinks or groups of hyperlinks to Web pages, text, images, photographs, tags, groups of tags, subject areas, concepts, profiles, answers, audio files, video files, software, or any combination of these, to name but a few objects.

For example, in accordance with the present invention, a query with the term X would return a results list of Web pages, including a Web page M somewhere in the list. Then a first user associates the Web page M with a tag containing the term X. A second user performing a search using the term X in a query is delivered a results list that may display the Web page M in a higher position than it would have been displayed prior to the creation of the tag by the first user.

In accordance with embodiments of the present invention, the degree to which Web page M is considered to be more relevant to the second user is determined by analyzing factors including, but not limited to, the number of times the term X is used in a tag for Web page M, the total number of all tags associated with Web page M, the number of tags the first user has created, the number of documents bookmarked or tagged by each user, the frequency with which the term X is used as a tag overall, the total number of tags overall, the number of tag/document pairs containing the term X, a reference to the Web page M, or both, the relationship between the first and second person, the level of confidence (e.g., confidence rating) that has been placed in the first and second person or in groups to which either the first person or the second person belongs to. The relationship or degree of similarity between users and to groups in which they belong, and the level of confidence attributed to a user can all be quantified using metrics. For example, ascribing a relationship metric of 1 between two users can indicate that they are more similar (e.g., have similar interests or share friends in common) than two users who have a relationship metric of 0.5. Additionally, if there is more than one word in the term X, other factors may be analyzed such as the number of words that are in the term X that are contained in the query by the second user, whether the words are used as a phrase, the word order, and all the previously mentioned factors; the analysis can also include analyzing the different combinations of words.

In accordance with other embodiments of the present invention, the search engine may not deliver results lists that have been ordered differently, but rather place some graphic element to indicate which documents have been included because they have tags associated with them.

In accordance with other embodiments of the present invention, tags may not be associated with documents explicitly by users, but rather by examining bookmarks, conducting searches, or other user behavior such as rating, blocking, saving or clicking.

In accordance with other embodiments of the present invention, tags may be associated not only with Web pages or groups of Web pages, but also with any identifiable data resource, public or private, including, but not limited to, images, photos, other tags, groups of tags, subject areas, user profiles, concepts, maps, audio or video files, software or other objects.

Throughout the following description, the term "search engine" is used to refer to an apparatus (or programs running on general purpose computers) that take as input a query and return a results list of hyperlinks to electronic documents or Web pages or other objects accessible over the Web. The search engine includes the index of documents in its corpus, the code and algorithms that determine the relevance of each document, and the graphical user interface that delivers the results list to the user.

Throughout the following description the term "query" refers to a set of terms submitted to the search engine whether typed, spoken, submitted through a "link" that already has embedded a set of search terms, or submitted by any other interface. A query may comprise a single word, multiple words, or phrases. The query can be phrased as a question (e.g., a "natural language" query), a loose set of terms, or a structured Boolean expression. Indeed, a query can comprise symbols or any other characters used by a search engine to search for electronic documents or Web pages containing or related to the search characters.

Throughout the following description, the term "Web site" is used to refer to a collection of Web pages that are linked together and are available on the World Wide Web. The term "Web page" refers to a document published on a Web site and accessible over the World Wide Web from any number of hosts and includes, but is not limited to, text, video, images, music, and graphics.

Throughout the following description the term "results list" refers to a list of hyperlinks or groups of hyperlinks that reference documents, objects (as defined above, including but not limited to images and video), or Web Pages that are accessible using the Hypertext Transfer Protocol (HTTP) or any other protocol for accessing Web pages or other electronic documents, along with other associated information for each link, including, but not limited to, titles of the documents, summaries of the documents, number of tags associated or other relevance metric, list of tags associated, links to cached copies of the documents, the date on which the documents were last indexed or last modified, images associated with or located within the documents, information extracted from the documents, and users who may have bookmarked or tagged it.

Throughout the following description the term "tag" refers to any data structure that contains any one of: one or more terms, each consisting of one or more words, a hyperlink that references an addressable object, and other information such as the time the tag was created and the user who created it. A Tag may contain a link to a variety of objects, for example, a Web Page, an image, a map, or other object on a computer network, whether on the Internet or on a local computer storage device. Tagging may also refer to the process of associating a term with a particular hyperlink to an addressable document or object.

As used herein, the term "bookmark" refers to any data structure that records any of the hyperlink, an identity of the user making the bookmark, the time that the bookmark was made, and a tag as defined above.

As used herein, the term "document" is defined broadly, and includes, in addition to its ordinary meaning, computer files and Web pages. The term "document" is not limited to computer files containing text, but also includes user profiles, concepts, answers, computer files containing graphics, audio, video, and other multimedia data. User profiles are pages or records that include, but are not limited to, information about a person such as his interests, hobbies, lists of friends, photographs, professional experience, and education, to name but a few items of information.

As used herein, the term "spammer" is defined as a person or entity who attempts to have a search engine display links to its product, Web Page or other material with a higher rank or greater frequency than the search engine would otherwise have displayed it, using any number of techniques designed to take advantage of the relevance methodologies of the search engine.

As used herein, the term "programmed" means any combination of hardware, software, firmware, other means used to execute computer instructions to store, process, transmit, or otherwise manipulate data.

As described in greater detail below, a search engine takes a query entered by a user and matches the search terms against an index of documents using a variety of relevance calculations with the objective of identifying those documents that are most likely related to the information sought by the users. The search engine then returns a ranked list of hyperlinks to these documents, with the documents thought to be most relevant nearer the top of the list. In accordance with the present invention, users have the ability to create tags which associate terms with documents, and a search engine returns a results list based at least partially on an analysis of the tags associated with Web pages.

In accordance with the present invention, the degree to which a tag influences the relevance of a document to a given query may be related to the level of confidence placed in the user who made the association. This level of confidence may be determined by factors such as how relevant the user's tags have been in the past, how similar the users' observed activity is to the other users in the audience or to the user performing the query, the degrees of connection between the users, and other factors.

Figure 1:
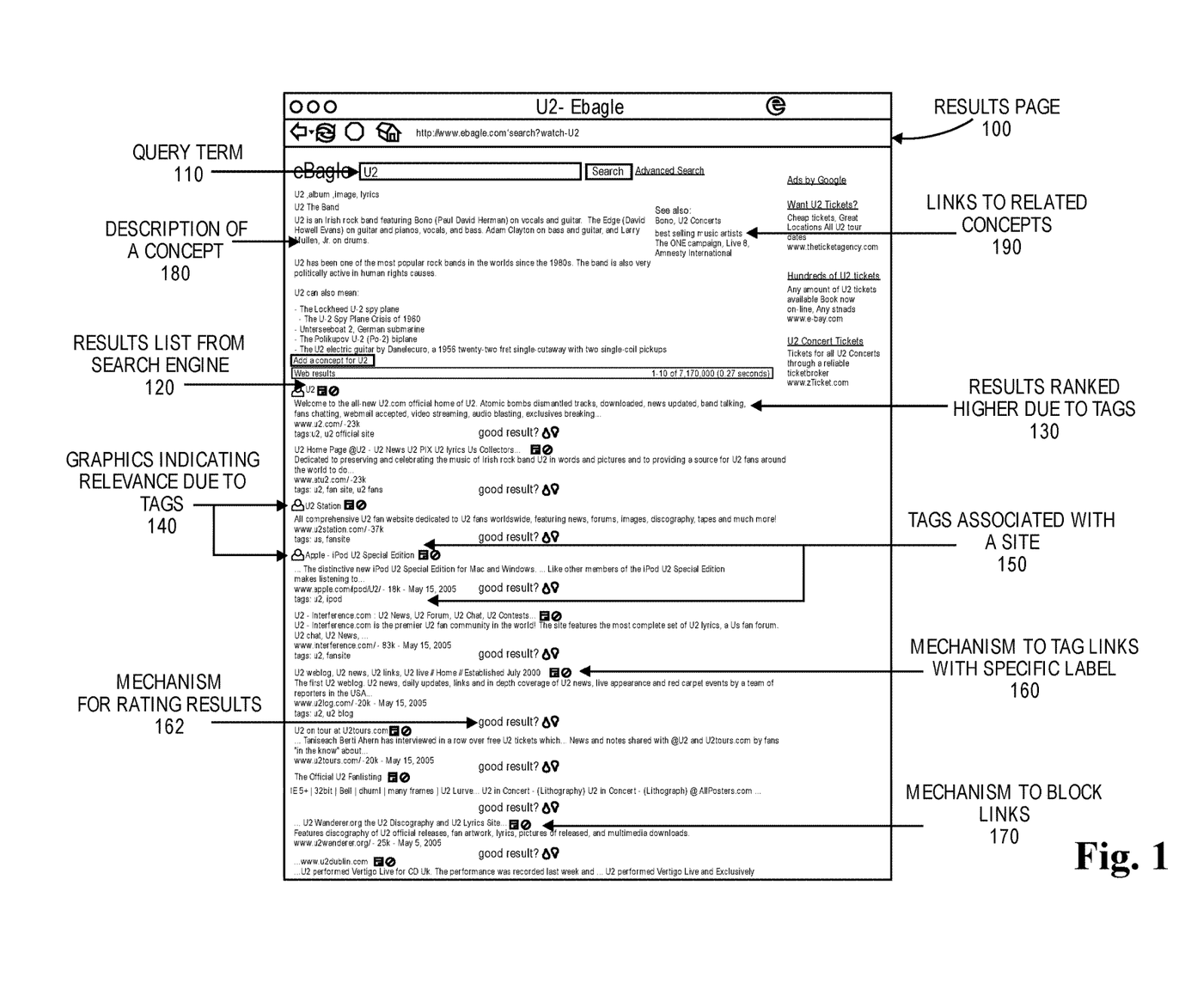
FIG. 1 is a schematic illustration of a graphical user interface displaying a search result list derived at least in part by analysis of tags, in accordance with one embodiment of the present invention.

FIG. 1 is a screen shot of a graphical user interface (GUI) displaying a results page 100 returned in response to a query in accordance with the present invention. The results list can be reordered or marked based on analysis of tags that have been associated with each link.

The results page 100 comprises a box 110 for inserting a query term, and an area 120 containing the results list returned by the search engine. The area 120 might also contain lists of tags 150 associated with each result returned by the search engine. As described in more detail below, in a preferred embodiment some or all of the results in the area 120 have been reordered 130 based on analysis of the tags 150, or in another embodiment, the results in the area 120 might also be reordered, but some are marked with graphics elements 140 to indicate that analysis of to tags and/or bookmarks 150 would have an impact on their relevance. The results page 100 also includes mechanisms 165 for rating objects.

Users can establish an association between documents and terms they think are descriptive of the documents. This process, as described previously, is referred to as "bookmarking" or "tagging". This is done by clicking on a hyperlink or graphic element 160 in area 120 to activate a mechanism for recording the hyperlink for later recall, in the case of bookmarking, or using an extension or toolbar or applet in the bookmarks toolbar, or associating a new tag or tags with a document, in the case of tagging. This element 160 could be a text link, an image such as a disk or any other representation that would suggest "bookmarking" or "tagging" the document. Since different users will have different ideas about what terms to associate with different documents, a rich and varied set of tags may be established. It is this set of tags that is analyzed in accordance with the present invention.

Users can block a link to a document from a results list if they do not think that the document is relevant to the query. This process is referred to as "blocking". This is done by clicking on a hyperlink or graphic element 170 in area 120 to activate a mechanism for blocking a link to a document. This element 170 could be a text link, an image (e.g. FIG. 1, 170) or any other representation that would suggest "blocking" or "removing" the document. Blocking the document will have the result of associating a negative tag for the document containing the term in the query. Since different users will have different ideas about what terms to associate with different documents, there will sometimes be disagreement as to whether a tag is appropriate for a document. Other times, spammers will overtly associate misleading tags with documents. As described in greater detail below, the positive and negative tags can be used to offset differences of opinion and to reduce the amount of spam, or other misleading documents.

The results page 100 may also include an area 180 for displaying a description for a concept related to the query term, and an area 190 containing "See also" links to other concepts relating to other query terms.

As shown in the example of FIG. 1, when a user enters the query term "U2" in the box 110 and requests a search, the results page 100 is returned to him. The area 120 contains a list of results which are links to objects related to the query term "U2". In a preferred embodiment, some of the results 130 have been reordered based on analysis of the tags 150 which users have associated with the various documents. For example, the document titled "U2 Home Page: @U2 . . ." located at www.atu2.com has been tagged with the terms "U2", "U2 fan site", and "U2 fans" as shown in the list of tags 150. The analysis of tags has caused this document to be listed higher in the results list than it otherwise would have. In another embodiment, results may be reordered and marked, but some results are marked with a graphic element 140 to show that analysis of user tags and/or bookmarks would indicate that people found those results to be more relevant and, optionally, the number of people who found them relevant. For example the document titled "U2 Station" located at www.u2station.com has been tagged with the terms "U2" and "U2 fansite", and has been marked with a graphic element of a person 140, indicating that other users have found it relevant. It will be appreciated that graphic elements other than an icon of a person could be used to inform users that the relevance has been indicated by other users.

If the user wished to bookmark and/or add a tag for a document, for example www.u2log.com, the user may choose to click on the graphical icon 160, which activates a mechanism for bookmarking and/or adding a tag, which could be the same as the tags already existing, the search term in area 110, or some other term that is meaningful to the user. If the user had done a different search, for example "lyrics", and the user did not believe the document titled "U2 Wanderer.org the U2 Discography and U2 Lyrics Site" should be listed for the query "lyrics" the user could click on the element 170 to block the document from the search result, which would have the effect of associating the tag containing the term "−lyrics" with the document. The minus sign ("−") denotes a dissenting, rather than affirming, association between the term and the Web page.

Continuing the example, the area 180 contains a concept describing the band "U2" and a list of other concepts related to the term "U2". The area 190 contains a set of "See also" links to related subjects, for example "Bono, U2 concerts, best selling music artists, the ONE campaign, Live 8 . . . " In accordance with the present invention, if the user selects one of these links, for example "Live 8", a query will be conducted using the search term "Live 8" resulting in a results page similar to the results page 100, in which the search term 110 is "Live 8" and the results list 120 is a list of links to documents that are relevant to the search term, and whose position in the list is influenced in turn by tags associated with the documents. The order of the results from any search are thus influenced by tagging. Subject areas and concepts are described in more detail in U.S. patent application Ser. No. 11/364,617, titled "Methods of and Systems for Searching by Incorporating User-Entered Information," filed Feb. 27, 2006, which is hereby incorporated by reference.

It will be appreciated that many modifications can be made in accordance with the present invention. For example, user-generated tags can be read from a file or imported from another service rather than input by a user directly from a terminal. Moreover, while the results page 100 shows results list 120 and lists of tags 150, and concepts 180, and links to concepts 190, it will be appreciated that in accordance with the present invention, results pages influenced by analysis of tags can be displayed with any combination of areas, including or in addition to those shown in FIG. 1, or without some of these areas. The tag information is used in combination with various page design elements to make search results more comprehensive, accurate, and meaningful.

Figure 2:
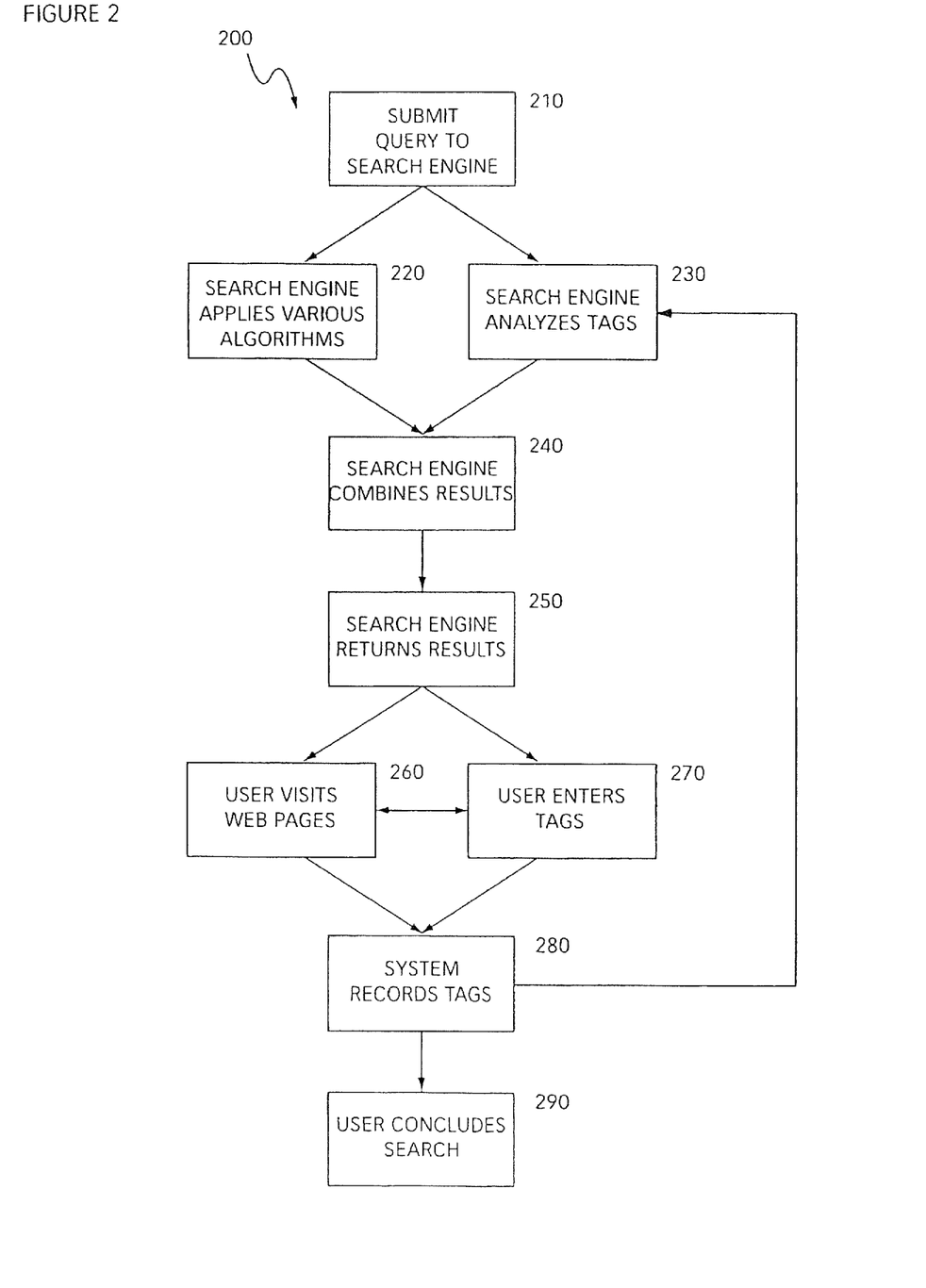
FIG. 2 is a flow diagram illustrating the operation of an Internet search application capable of applying tags to the process of ranking documents, in accordance with one embodiment of the present invention.

FIG. 2 is a flow diagram illustrating the operation of an Internet search application 200 in accordance with the present invention. The Internet search application 200 provides the ability for users to submit queries to the search engine and receive results which have been determined at least in part by an analysis of tags, thereby providing users with more relevant search results than would otherwise be provided. Users may visit the Web pages shown in the results list, and they may also choose to "bookmark" some of those pages to indicate whether they find the pages relevant or irrelevant. They may tag those pages with the query term or with some other term or terms. The search engine records any tags submitted and uses them in future searches by other users.

In the step 210, the user submits a query to a search engine. The process then continues to both step 220, in which the search engine matches the query with objects in the corpus using a variety of information retrieval approaches using various algorithms in order to assemble a list of the most relevant documents, and step 230, in which the search engine analyzes the tags associated with various documents, in order to assemble a list of the most relevant documents. The analysis of tags may be generic for all users or may be tailored to the individual user who is conducting the search, or tailored to a group of which the user is a member. The steps 220 and 230 proceed to the step 240, in which the results from the step 230 are combined with the results from the step 220 to provide more relevant results. The process then continues to the step 250, in which the results page (e.g., 100, FIG. 1) is sent to the user. From the step 250 the user can select to proceed to either of the steps 260 or 270.

In the step 260, the user follows one or more of the links to visit the documents in the results list. Alternatively, in the step 270, the user bookmarks and optionally enters tags, each of which associates one or more terms with one of the documents in the results list. To enter a tag, the user may click on a mechanism to bookmark or tag a document (e.g, area 160, FIG. 1) which brings up a user interface in which the user enters tags, or in the step 260, the user may use a "bookmarklet" loaded into his browser, or other similar mechanism, to bookmark the document and enter the tag. Alternatively, in the step 270, the user may block documents as being unrelated to the query by clicking on a mechanism for blocking (e.g, area 170, FIG. 1). From the step 260, visiting documents in the results list, the user can proceed to the step 270, entering tags and alternatively from the step 270, the user can proceed to the Step 260. Both of the steps 260 and 270 lead to the step 280, in which the system records bookmarks, tags, and ratings entered by the user. The step 280 loops back to the step 230 in which the database of tags that are analyzed during any subsequent searches now contains these new tags entered in the step 270. In parallel with looping back to the step 230, the process also continues to the step 290, in which the user has concluded his search.

Figure 3:
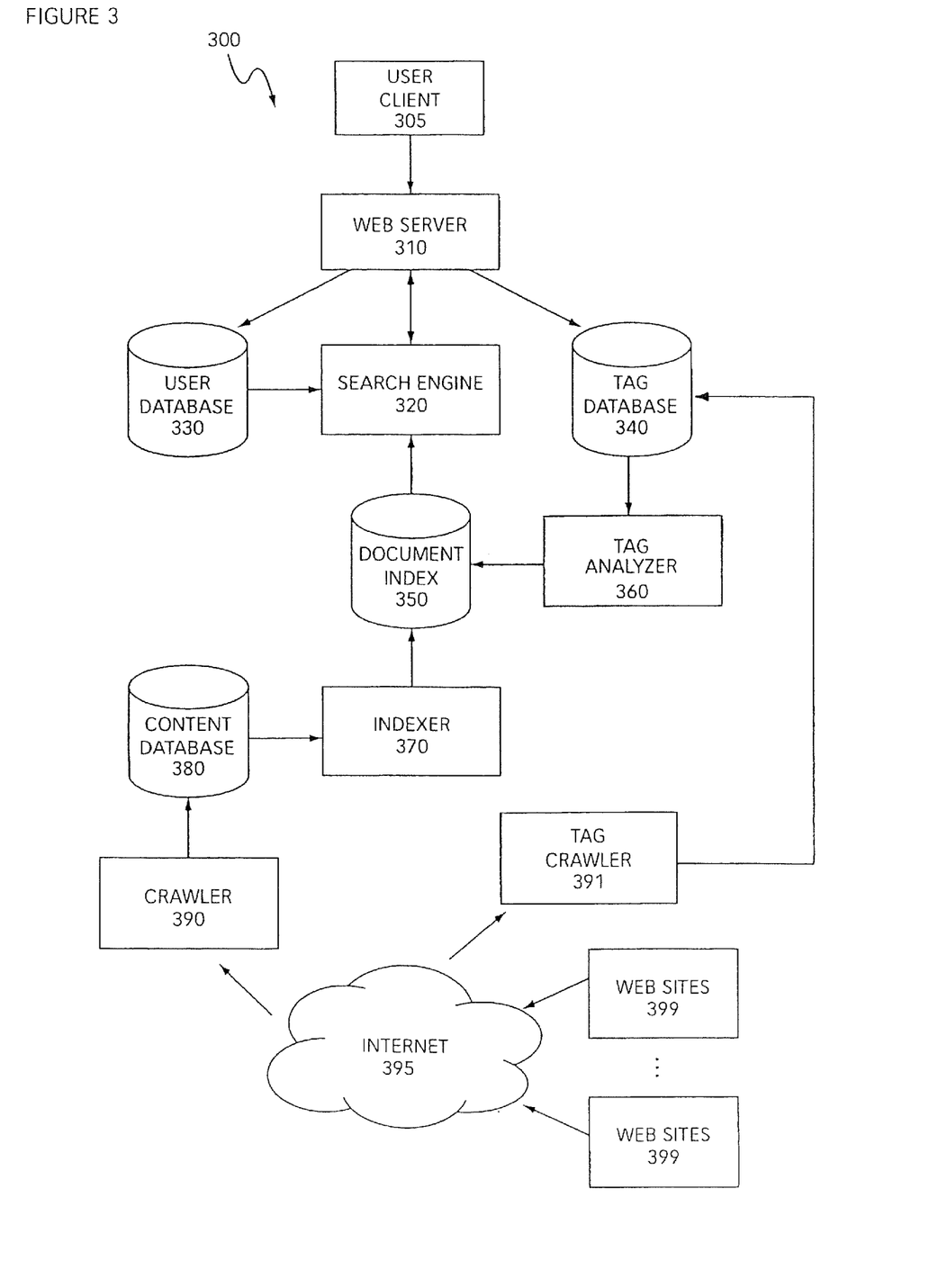
FIG. 3 is a schematic diagram illustrating the components of an Internet search application, in accordance with one embodiment of the invention.

FIG. 3 illustrates the components of a system 300 in accordance with the present invention. The system 300 comprises a user client 305 that couples to a Web server 310. The Web server 310 is coupled to a search engine 320, a user database 330, and a tag database 340. The search engine 320 is coupled to a document index 350. The user database 330 is also coupled to the search engine 320. The tag database 340 is coupled to a tag analyzer 360 and to a tag crawler 391. The tag analyzer 360 is also coupled to the document index 350, which in turn is coupled to an indexer 370. The indexer 370 is coupled to a Web content database 380, which is coupled to a Web crawler 390. The Web crawler 390 and the tag crawler 391 are coupled to one or more Web sites 399 over the Internet 395.

In operation, the web crawler 390 navigates over the Internet 395, visiting Web sites 399, and populating the Web content database 380 with the contents of the Web pages it accesses. The indexer 370 uses the Web content database 380 to create the document index 350. The tag crawler 391 navigates over the Internet 395, visiting Web sites 399, and populating the tag database 340 with the tags it finds.

When a user conducts a search, he enters a query using the user client 305, which is submitted to the Web server 310. The Web server 310 submits the query to the search engine 320 which matches the query against the document index 350 using relevance algorithms and factors derived from the tag analysis described above to determine the most relevant documents, and returns the results list to the Web server 310. The Web server 310 then delivers the results page (e.g., 100, FIG. 1) to the user client 305 for display.

Also in response to the query, the user database 330 records information about the user's search, such as links followed from the results list (e.g, area 120, FIG. 1), documents bookmarked, or rated (e.g., step 165) and tags entered using the tag entry mechanism (e.g, area 160, FIG. 1) and documents blocked using the blocking mechanism (e.g, area 170, FIG. 1) which has the effect of entering negative tags. This information is used by the Web server 310 and the search engine 320 to customize subsequent search results for that user and to determine the amount of confidence to place in that user's tags. Also in response to a query, tags entered by the user using the tag entry mechanism (e.g, area 160, FIG. 1) and negative tags entered by the user using the blocking mechanism (e.g, area 170, FIG. 1) are also recorded in the tag database 340. Within an embodiment of the invention, the information stored in the user database 330 and the tag database 340 may be implemented as two separate databases or they may be implemented within the same database.

On some timely basis, but not necessarily when a query is performed, the tag information contained in the tag database 340 is sent to the tag analyzer 360, where it is analyzed to determine what influence on relevance is asserted by the various tags associated with each document by each user in order for the search engine 320 to determine the most relevant Web pages for queries. The tag analyzer 360 records this tag relevance information in the document index 350 for use in subsequent searches.

The tag database 340 sends features to the tag analyzer 360 including, but not limited to, query terms, user identifiers, document IDs, document links, tag terms, ratings, and time stamps. The tag analyzer 360 can also look up other features for the given document including, but not limited to, density of the terms within the document, position of the terms within the document, presence of the terms in various sections of the document, and hyperlinks to the document containing the terms. The tag analyzer 360 can also look up other information for the given user including, but not limited to, previous tag history, bookmark history, level of confidence, similarity with other users (e.g., similarity between the search terms used and tags created by this user and other users), and membership in groups.

Figure 4:
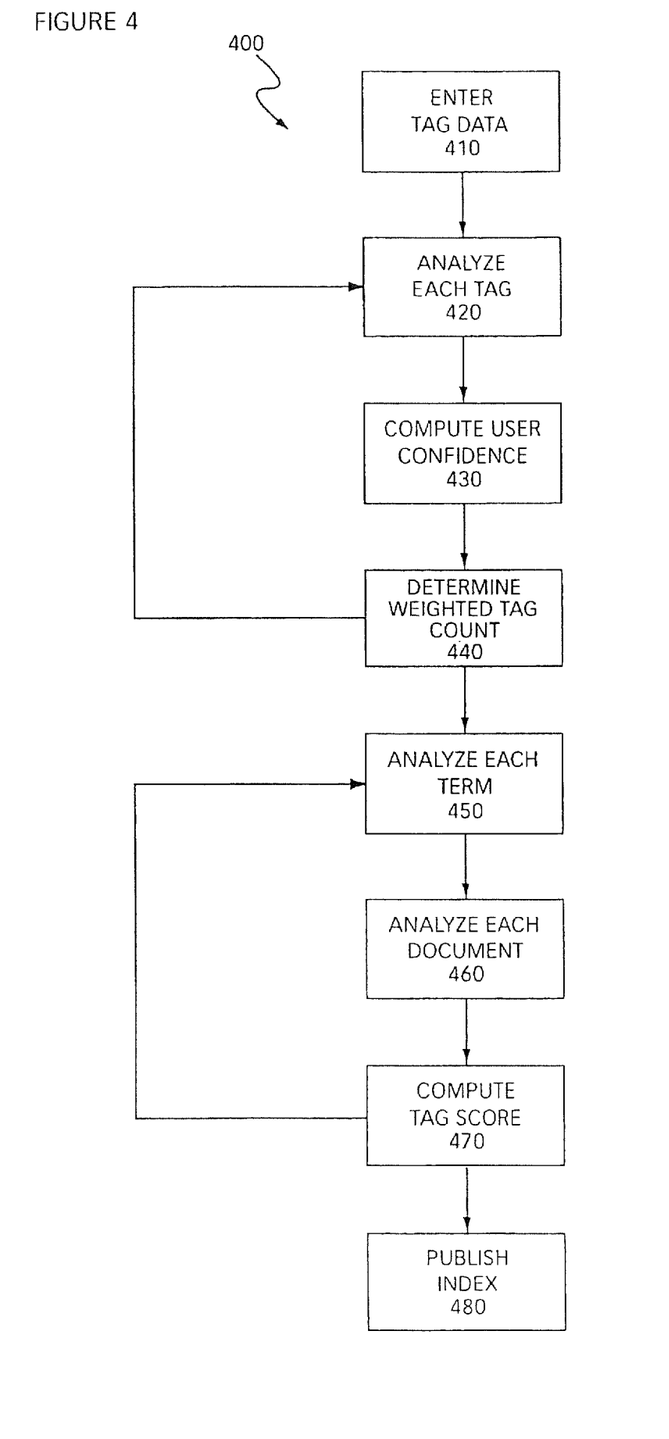
FIG. 4 is a flow diagram illustrating the process for preparing and analyzing tag data in accordance with one embodiment of the present invention.

The tag analyzer 360 uses these features to develop a set of relevance scores for various documents according to different tags. The process by which these features are analyzed is shown in FIG. 4 and described in detail below. A mechanism is used to calculate the relevance on a user level or a generic solution for any given query-document pair.

An analysis is performed on the tag data referred to previously. Generally the relevance of any given document for any given query will be a function of factors including, but not limited to, the number of tags which contain terms that are in the query, the number of times any given tag is used in the corpus of tags, the total number of tags that refer to the given document, the number of tag document pairs that are similar, the number of words in the term that match, the number of times that the document has been bookmarked, and the value and number of ratings applied to the document. Additionally, the predictive ability of any tag of relevance for a given document is proportional to the level of confidence that has been placed in the user who entered the tag, if it can be assessed. It will be appreciated that the relevance modeling process in accordance with the present invention can be performed using other forms of analysis, as well as other methods, including, but not limited to, any statistical classification or rank regression algorithm, such as logistic regression, support vector machines, classification or regression tree, or boosted tree ensembles.

FIG. 4 is a flow diagram illustrating steps 400 for preparing and analyzing tag data in preparation for determining relevance of documents for queries, in accordance with one embodiment of the present invention.

Referring to FIG. 4, in the step 410, tag data is entered by the user through a Web client and a Web server (e.g. 305, 310, FIG. 3) or by a tag crawler (e.g. 391, FIG. 3), and submitted to a tag database (e.g. 340, FIG. 3) by the system (e.g. the step 280, FIG. 2). The step 410 may proceed on a continuous basis and over a period of time independent of the remaining steps of the process described by FIG. 4.

In the step 420, each tag in the tag database (340, FIG. 3) is analyzed. The process of analyzing each tag proceeds through the step 430, computing user confidence, and the step 440, determining weighted tag count. In the step 430, for each tag entered, the level of confidence of the user who entered the tag is computed. The degree to which the tag will influence the relevance of documents to which it refers is a function of the level of confidence placed in the user who entered it.

The level of confidence may be computed with an algorithm or using a statistical model of user behavior including, but not limited to, bookmarking, tagging, clicking, ranking, or blocking, based on how closely the user's behavior matches that of the user community for the given term or subject area, or based on the confidence placed in that user by other users by virtue of rating the user, connecting with that user in a social network, or tagging or subscribing to the tags entered by that user. For example, if a user, Luke, tags a given document X with the team A and others have tagged the document X with the terms D and F, the full set of tags associated with the document X is {a,d,f} where the lower case label "a" denotes an actual instance of tagging using the term "A". Continuing with the example, if two other users, Simon and Peter, doing searches using the query term A, each blocks the document X, the document X will now be tagged with {a, −a, −a, d, f}. As a result, the confidence level of Luke will be decreased because a plurality of users disagreed with his tags, and the confidence levels of Simon and Peter will be increased because their tags were consistent with the plurality of users. It will be appreciated that there may be other methods for determining how much confidence to place in a user that are consistent with the present invention. If the user is unknown or the level of confidence of the user cannot be determined, a level of confidence which is neutral, or is inherited from the source where the tag was obtained, is assigned to the tag. It will be appreciated that user confidence may be computed at the time of analyzing tags or through some process that occurs on some other timely basis.

In the step 440, the weighted tag count of each document or group of documents for each term is determined. If a document X has been tagged n times using the term A, the weighted tag count for the document X for the term A is an aggregate of all the tags $a_1$ through $a_n$ whether positive or negative, which reference the document X, factoring in the confidence levels for each user, U, who created each tag $a_i$, for i=1 to n. Additionally, if a user enters many tags then the user may be considered to tag documents frequently, and the weight of any given tag by that user may be considered to be of less weight than the tag of a user who tags infrequently. Additionally, tags may be considered to be of less weight if they were created earlier in time, and of more weight if they were created more recently. It will be appreciated that there are other factors that may be considered when determining the weighted tag count that would be considered part of the present invention. Once the weighted tag count is determined for each document for each term, the process proceeds to the step 450.

In the step 450, each term in the corpus is analyzed in order to establish the tag scores for each document or group of documents for each term. The process of analyzing each term proceeds through the step 460, analyzing each document, and the step 470, computing a tag score for each document.

In the step 460, the next document whose tag score is to be computed is analyzed. All the information previously gathered or computed regarding that document is aggregated and additional analysis is completed. For example, factors that may be considered include, but are not limited to, occurrence or density of the term in the document, position of the term in the document, presence of multiple terms in the same tag, presence of the term in the anchor text of hyperlinks to the document, the time at which the tag was created or last modified, and similarity of the term to other terms in the document either based on statistical analysis, clustering analysis or morphological analysis or any other form of analysis which determines similarity. Once the document has been analyzed, the process continues to the step 470, computing a tag score for the document for the term.

In the step 470, the tag score is computed for the current document for the current term. The tag score for each document is a function of the total number of tags that refer to the document, with each tag contributing to the computation according to the weight applied to it, which is the weighted tag count, as determined in the step 440 above. Additionally, the contribution of each tag to the tag score is proportional to the confidence assessed to the user who entered the tag as determined in the step 430 above, and the analysis of the document as completed in the step 460. The tag score $S_A$ for the document X for the term A is a function of the total number of different terms present in the tag database (e.g. 340, FIG. 3), the total number of tags present in the tag database, the frequency with which the term A is present in the tag database, the number of different terms with which the document X has been tagged, the total number of tags associated with the document X, and the number of different documents that have been tagged with the term A. The combination of these factors is computed such that a value is assigned for the tag score of each document. It will be appreciated that there are other factors which may be computed which would be considered to be part of the present invention. In a preferred embodiment of the present invention the tag score is tailored to individual users or groups of users. In another embodiment of the present invention, the tag score for each document is the same for each user of the system. The step 470 loops back on the step 450 until each of the documents in the corpus have had a tag score value assigned to it for each term. The process then proceeds to the step 480.

In the step 480, each document which has been tagged by a given tag, is indexed so that the tag score for each document for each term is recorded in a format that can be easily and quickly retrieved at search time in order to determine the relevance of all documents with respect to the query term as determined by tag analysis. The index of documents and their tag scores, and tag weights and user confidence levels can be published to a document index (e.g. 340, FIG. 3) that can be searched quickly and easily by a search engine (e.g. 320, FIG. 3) at search time, in order to calculate the relevance of each document with the query term as determined by tag analysis alone or in combination with other search techniques. It will be appreciated that in other embodiments of the present invention certain steps of this process 400 may be left out or other steps may be inserted, or that different weights may be applied or different tag scores calculated and still be considered to be within the scope of the present invention.

Figure 5:
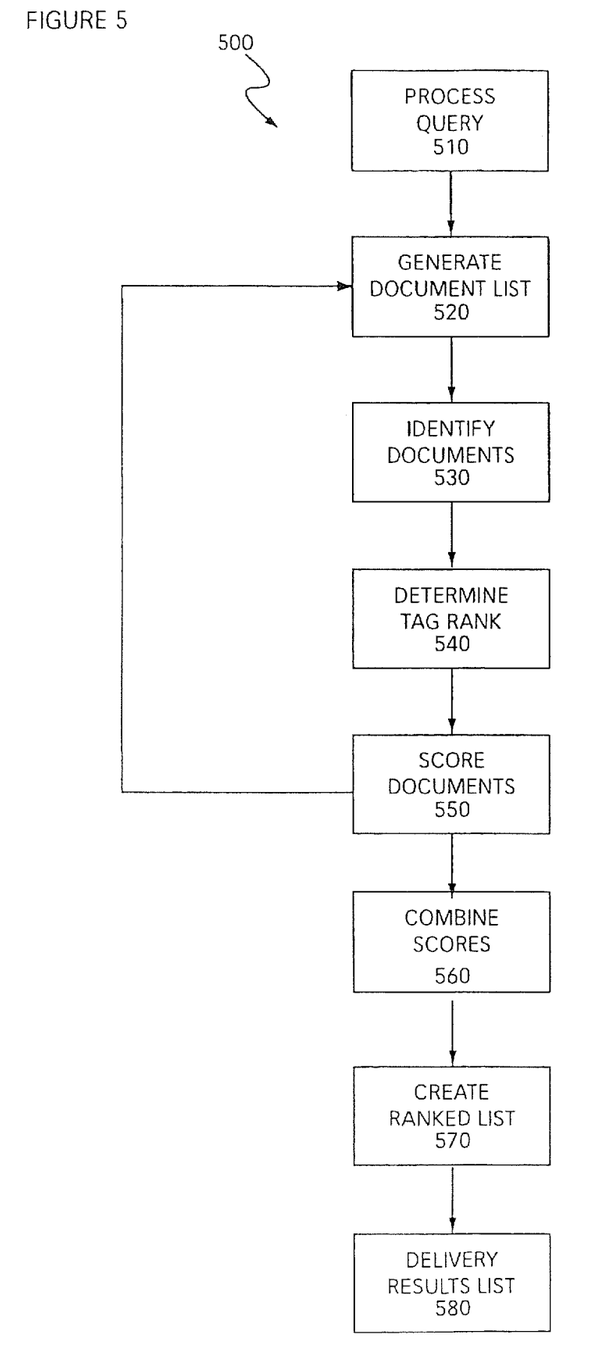
FIG. 5 is a flow diagram illustrating steps to compute results using tag data, in accordance with one embodiment of the present invention.

FIG. 5 is a flow diagram illustrating steps 500 for computing results using tag data, in accordance with one embodiment of the present invention.

Referring to FIG. 5, in the step 510, the search engine processes the query (e.g. 230, FIG. 2), which may contain one or more terms.

In the step 520, the search engine generates a list of the documents or groups of documents which are most relevant to the query, based on each term in the query. The process of determining the relevance based on each term proceeds through the steps 530, identifying documents, 540, determining tag rank and 550, scoring each document. In the step 530, for each term in the query, a list of the documents which might be considered relevant at all is generated, based on the tags with which those documents have been associated. This list may range in length from very short (e.g., 5 or fewer) to very, very long (e.g., 10,000,000 or more). It will be appreciated that this list may be truncated for practical purposes in search applications, and that it may or may not be sorted according to the requirements of a specific embodiment.

In the step 540, the tag score of each document is determined with respect to a term or any grouping of terms. The tag score of each document will be a function of the tag score assigned to that document in the index, and will be influenced by the current confidence level of the users who submitted the tags which are being used to calculate the tag score, and may be different for individual users or users who are members of certain groups.

In the step 550, each document is scored with a value that determines into which position in a results list that document would be placed based on the query term currently being considered. The step 550 loops back to the step 520 until all terms in the query have been considered.

In the step 560, the relevance scores for each of the documents based on each of the terms in the query are combined in order to compute the overall relevance scores for each document against the complete query submitted. Next, in the step 570, a ranked results list is created, and in the step 580 that results list is delivered to the search engine to be combined with whatever other relevance methodologies are used (e.g. the step 240, FIG. 2). It will be appreciated that in other embodiments of the present invention certain steps of this process 500 may be left out or processed in a different order or other steps may be inserted, or that different weights may be applied or different tag scores calculated and still be considered to be within the scope of the present invention.

Figure 6:
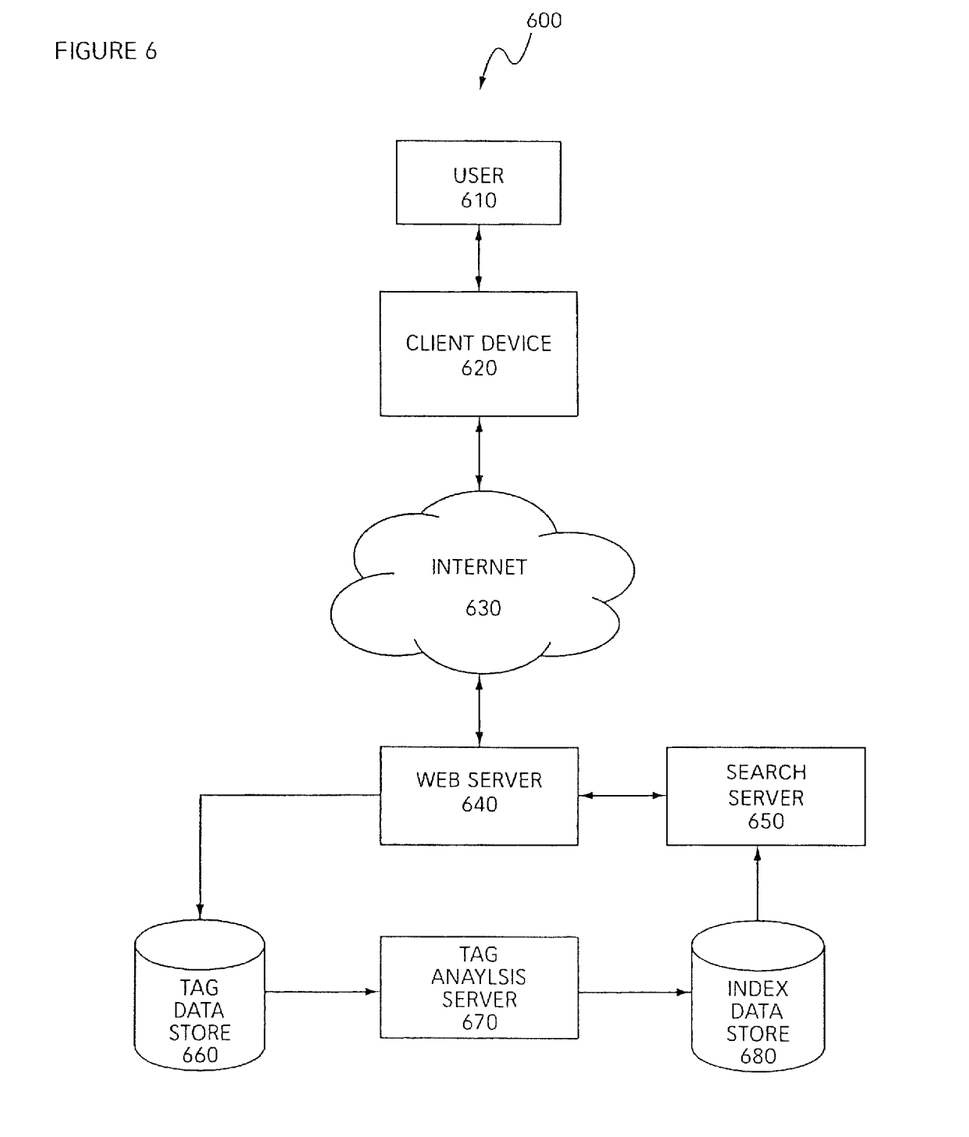
FIG. 6 is a hardware diagram illustrating the components of an Internet search application in accordance with one embodiment of the present invention.

FIG. 6 illustrates the hardware components for an Internet search application system 600 for use by a user 610 in accordance with the present invention. The system 600 comprises a client device 620 coupled over the Internet 630 to a Web server 640. The client device 620 is any device used to access the Web server 640 and configured to communicate using Internet protocols including, but not limited to, HTTP (the HyperText Transfer Protocol) and WAP (Wireless Application Protocol). Preferably, the client device 620 is a personal computer but it can also be another device including, but not limited to, a hand held device such as a cell phone or personal digital assistant (PDA) and is capable of presenting information using standards such as HTML (the Hypertext Markup Language), HDML (Handheld Device Markup Language), WML (wireless markup language), or the like.

The Web server 640 is coupled to both a search server 650 and a tag data store 660. The tag data store 660 is coupled to a tag analysis server 670 and the search server 650 is coupled to an index data store 680. Additionally the tag analysis server 670 is coupled to the index data store 680.

Figure 7:
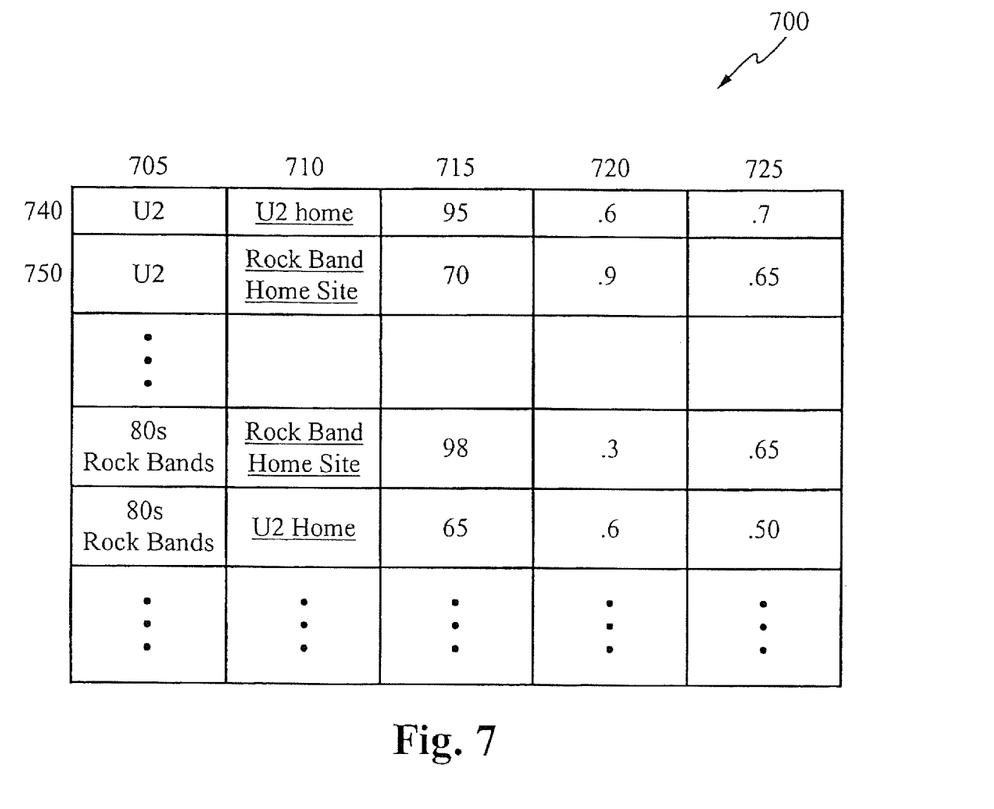
FIG. 7 shows a document index in accordance with one embodiment of the present invention.

FIG. 7 shows a document index 700 in accordance with one embodiment of the present invention. Those skilled in the art will recognize that the document index 700 is a conceptual structure used to explain the methods of the present invention and that preferred document indexes use inverted indexes. The document index 700 includes exemplary first and second rows 740 and 750, respectively, each containing tag-object pairs and related information in the columns 705, 710, 715, 720, and 725. Referring to the row 740, the column 705 contains the tag "U2", the column 710 contains an object, here a hyperlink to a Web page ("U2 Home"), the column 715 contains a raw (e.g., unweighted) relevance score (95) for the tag-object pair ("U2-U2 Home"), the column 720 contains a weight for this tag-object pair, and the column 725 contains a user confidence rating for the user who associated the tag U2 to the object "U2 Home." The row 750 contains similarly identified information. The entry in the column 720 (0.6) determines the weight to give the tag "U2" in this tag-object pair. This weight can be determined from the user confidence rating in column 725 (0.7) combined with other confidence factors, such as the time the tag was associated with the object, to determine a weight 0.6. The relevance score for this tag-object pair equals the raw relevance (0.95) score multiplied by the weight (0.6) to determine the final relevance score, 57. In a similar manner, the relevance score for the tag-object pair in the row 750 is determined to be 70*0.9, or 63. Thus, if a user ran a search query containing the term "U2", the object "Rock Band Home Site", corresponding to the object in the row 750, would be ranked higher in the returned (organized) results list than the object "U2" in the row 740, indicating that it is more relevant to the user's search.

It will be appreciated that the document index 700 is merely exemplary. Different combinations of entries, different ranges for relevance scores, different algorithms for determining relevance scores, to name a few different configurations, can also be used.

It will be readily apparent to one skilled in the art that various modification may be made to the embodiments without departing from the spirit and scope of the invention as defined by the appended claims.

We claim:

1. A computerized method of determining relevancies of multiple objects to a search query, comprising:

associating one or more of the multiple objects with tags as a result of user input of a plurality of users, thereby defining one or more corresponding tag-object pairs, wherein each tag comprises a plurality of tag terms, each tag term comprising text, and wherein each association of an object with a tag comprises a tag object pair;

associating an object with each tag term from the plurality of tag terms of each tag associated with the object, thereby defining one or more corresponding tag term object pairs;

determining for each tag term object pair a tag term score indicating a degree of relevance between the tag term and the object;

determining for one or more objects a term relevance score comprising combining the tag term scores from the tag term object pairs for each tag associated with each object; and determining a relevance score for each of the multiple objects for the search query based, at least in part, on the term relevance scores determined for the one or more objects.

2. The method of claim 1, wherein combining the tag term scores comprises summing the tag term scores.

3. The method of claim 1, wherein combining the tag term scores comprises weighing each tag term score with a weight and summing the weighted tag term scores.

4. The method of claim 1, wherein a relevance score for a tag object pair is determined from a number of times a tag term in the tag has been associated with the object, a number of tags associated with the object, a number of times that the tag has been associated with the multiple objects, or any combination of these.

5. The method of claim 1, wherein a relevance score for a tag object pair is determined from a number of tag object pairs that contain a tag term in the tag, a number of tag object pairs that contain a reference to the object, or both.

6. The method of claim 1, wherein:

the associating one or more of the multiple objects with tags is performed by a first user, wherein the tag contains one or more tag terms;

the search query contains the one or more tag terms in the tag and is performed by a second user;

a result list is presented to the second user; and the term relevance scores are influenced by a level of confidence placed in the first user or in groups to which the first user belongs.

7. The method of claim 6, wherein a relevance score for an object and the search query is determined from relevance scores for each term of the search query present in the object or associated with the object.

8. The method of claim 6, wherein a relevance score for a tag object pair is further determined from a number of tags that the first user has associated with any of the multiple objects, a number of objects that the first and second users have associated with tags, or both.

9. The method of claim 6, wherein the level of confidence is a confidence rating of the first user.

10. The method of claim 9, wherein the confidence rating is based on behavior of the first user comprising bookmarking, tagging, clicking, ranking, or blocking.

11. The method of claim 9, wherein the confidence rating is based on users tagging or subscribing to tags entered by the first user.

12. The method of claim 9, wherein the confidence rating is determined from a similarity metric between search activities for the first and second users, a connection metric between the first and second users, or any combination of these.

13. The method of claim 6, wherein the level of confidence is based on how closely a user's tagging behavior matches that of other users.

14. The method of claim 6, further comprising marking at least one of the multiple objects in the result list with a graphic element.

15. The method of claim 1, wherein associating one or more of the multiple objects with tags comprises entering the tag in an area presented to a user, rating the tag, blocking a link to the object, selecting the tag, or selecting the object.

16. The method of claim 1, wherein associating one or more of the multiple objects with tags comprises analyzing input given by a user conducting a search.

17. The method of claim 1, wherein the multiple objects comprise hyperlinks to Web pages or groups of hyperlinks to Web pages.

18. The method of claim 1, wherein the multiple objects comprise hyperlinks or groups of hyperlinks to text, images, photographs, tags, groups of tags, subject areas, concepts, user profiles, answers, audio files, video files, software, or any combination of these.

19. The method of claim 1, wherein a tag crawler associates at least one of the multiple tags with at least one of the multiple objects.

20. A computerized method of determining relevancies of multiple objects to a search query, comprising:
   associating one or more of the multiple objects with tags as a result of user input from a plurality of users, thereby defining one or more corresponding tag-object pairs, each tag comprising a plurality of tag terms, and each tag term comprising text, wherein each association of an object with a tag comprises a tag object pair;
   associating each tag term of each tag with the object associated with the tag, wherein each association of an object with a tag term comprises a tag term object pair;
   determining for each tag term object pair a tag term score indicating a degree of relevance between the tag term and the object; and
   determining a relevance score for each of the multiple objects for the search query, the relevance score comprising combining the tag term scores from the tag term object pairs for each tag associated with each object, wherein the relevance score is influenced by tags associated with objects as a result of user input.

21. The method of claim 20, wherein:
   the associating one or more of the multiple objects with tags is performed by a first user, wherein the tag contains one or more tag terms;
   the search query contains the one or more tag terms in the tag and is performed by a second user; and
   the relevance scores are influenced by a level of influence placed in the first user or in groups to which the first user belongs.

22. The method of claim 21, wherein the level of influence is a confidence rating of the first user.

23. The method of claim 22, wherein the confidence rating is based on a relationship between the first user and the second user.

24. The method of claim 23, wherein the relationship is based on the second user following the first user.

25. The method of claim 24, wherein the second user following the first user comprises the second user rating the first user, the second user connecting with the first user in a social network, the second user tagging one or more tags entered by the first user, or the second user subscribing to tags entered by the first user.

26. The method of claim 22, wherein the confidence rating is determined from a similarity metric between search activities for the first and second users.

27. The method of claim 21, wherein the level of influence is based on behavior of the first user comprising bookmarking, clicking, ranking, or blocking links to objects.

28. The method of claim 21, wherein the level of influence is based on how closely a tagging behavior of the first user matches tagging behavior of a user community for a given term or subject area or based on a confidence placed in the first user by other users by virtue of rating the first user.

29. The method of claim 20, wherein combining the tag term scores comprises summing the tag term scores.

30. The method of claim 20, wherein combining the tag term scores comprises weighing each tag term score with a weight and summing the weighted tag term scores.

31. The method of claim 20, wherein a relevance score for a tag object pair is determined from a number of times a tag term in the tag has been associated with the object, a number of tags associated with the object, a number of times that the tag has been associated with the multiple objects, or any combination of these.

32. The method of claim 20, wherein a relevance score for a tag object pair is determined from a number of tag object pairs that contain a tag term in the tag, a number of tag object pairs that contain a reference to the object, or both.

33. The method of claim 20, wherein a relevance score for an object and the search query is determined from relevance scores for each term of the search query present in the object or associated with the object.

34. The method of claim 20, wherein a relevance score for a tag object pair from multiple tag object pairs is determined from a number of tags that a first user has associated with any of the multiple objects, a number of objects that the first user and a second user have associated with tags, or both.

35. The method of claim 20, further comprising displaying the multiple objects in a result list.

36. The method of claim 35, further comprising marking at least one of the multiple objects in the result list with a graphic element.

37. The method of claim 20, wherein associating one or more of the multiple objects with tags comprises entering the tag in an area presented to a user, rating the tag, blocking a link to the object, selecting the tag, or selecting the object.

38. The method of claim 20, wherein associating one or more of the multiple objects with tags comprises analyzing input given by a user conducting a search.

39. The method of claim 20, wherein the multiple objects comprise hyperlinks to Web pages or groups of hyperlinks to Web pages.

40. The method of claim 20, wherein the multiple objects comprise hyperlinks or groups of hyperlinks to text, images, photographs, tags, groups of tags, subject areas, concepts, user profiles, answers, audio files, video files, software, or any combination of these.

41. The method of claim 20, wherein a tag crawler associates at least one of the multiple tags with at least one of the multiple objects.

* * * * *